(12) United States Patent
You et al.

(10) Patent No.: US 9,298,990 B2
(45) Date of Patent: Mar. 29, 2016

(54) OBJECT TRACKING METHOD AND DEVICE

(71) Applicants: Ganmei You, Beijing (CN); Yaojie Lu, Beijing (CN); Zhongchao Shi, Beijing (CN); Chao Chen, Beijing (CN); Gang Wang, Beijing (CN)

(72) Inventors: Ganmei You, Beijing (CN); Yaojie Lu, Beijing (CN); Zhongchao Shi, Beijing (CN); Chao Chen, Beijing (CN); Gang Wang, Beijing (CN)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/568,223

(22) Filed: Dec. 12, 2014

(65) Prior Publication Data

US 2015/0169956 A1    Jun. 18, 2015

(30) Foreign Application Priority Data

Dec. 16, 2013 (CN) .......................... 2013 1 0687905

(51) Int. Cl.
*G06K 9/00* (2006.01)
*G06K 9/52* (2006.01)
*G06K 9/46* (2006.01)
*G06K 9/62* (2006.01)

(52) U.S. Cl.
CPC .......... *G06K 9/00624* (2013.01); *G06K 9/4604* (2013.01); *G06K 9/52* (2013.01); *G06K 9/6215* (2013.01)

(58) Field of Classification Search
CPC ... G06K 9/00624; G06K 9/4604; G06K 9/52; G06K 9/6215
USPC ....................................................... 382/103
See application file for complete search history.

(56) References Cited

U.S. PATENT DOCUMENTS

| 6,674,877 B1 * | 1/2004 | Jojic ................. G06K 9/00369 348/169 |
| 7,224,830 B2 * | 5/2007 | Nefian ............... G06K 9/00362 348/42 |
| 8,073,196 B2 | 12/2011 | Yuan et al. |
| 2011/0052043 A1 | 3/2011 | Hyung et al. |
| 2011/0299774 A1 * | 12/2011 | Manders ................ G06F 3/017 382/168 |
| 2013/0163821 A1 | 6/2013 | You et al. |

OTHER PUBLICATIONS

Hu et al., "A Complete U-V-Disparity Study for Stereovision Based 3D Driving Environment Analysis", 3DIM (2005) IEEE: pp. 204-211.

* cited by examiner

*Primary Examiner* — Tom Y Lu
(74) *Attorney, Agent, or Firm* — Harness, Dickey & Pierce, P.L.C.

(57) ABSTRACT

Disclosed is an object tracking method. The method includes steps of obtaining a first boundary region of a waiting-for-recognition object in the disparity map related to the current frame; calculating a probability of each valid pixel in the first boundary region so as to get a pixel probability map of the waiting-for-recognition object; obtaining historic tracking data of each tracked object, which includes identifier information of the tracked object and a pixel probability map related to each of one or more prior frame related disparity maps prior to the disparity map related to the current frame; determining identifier information of the waiting-for-recognition object, and updating the pixel probability map of the waiting-for-recognition object; and updating, based on the updated pixel probability map of the waiting-for-recognition object, the first boundary region of the waiting-for-recognition object, so as to get a second boundary region of the waiting-for-recognition object.

10 Claims, 15 Drawing Sheets

BOUNDARY REGION
OF N^TH FRAME
RELATED DETECTED OBJECT

EXTRACTED PRINCIPAL
DISPARITY PLANE (Z=d)

FIG.8
| | | | | | |
|---|---|---|---|---|---|
| 1 | ... | 1 | . | ... | 0.001 |
| 1 | ... | 1 | . | ... | 0.001 |
| 0.001 | ... | 1 | . | ... | 0.001 |
| 0.001 | ... | 1 | . | ... | 0.001 |
| 0.001 | ... | 1 | . | ... | 0.001 |
| 0.001 | ... | 1 | . | ... | 0.001 |
| 0.001 | ... | 1 | . | ... | 0.001 |
| 0.001 | ... | 1 | 0.8 | ... | 0.001 |
| 0.001 | ... | 1 | 1 | ... | 0.001 |
| 0.001 | ... | 0.4 | 1 | ... | 0.001 |
| 0.001 | ... | 0.4 | 1 | ... | 0.001 |
| 0.001 | ... | 0.4 | 1 | ... | 0.001 |
| 0.001 | ... | 0.4 | 1 | ... | 1 |
| 0.001 | ... | 0.4 | 1 | ... | 1 |
FIG.9
220'
S221: EXTRACT PRINCIPAL DISPARITY PLANE
S222: CALCULATE PROBABILITY OF EACH VALID PIXEL IN FIRST BOUNDARY REGION BELONGING TO WAITING-FOR-RECOGNITION OBJECT
S223: GRADUALLY EXPAND FIRST BOUNDARY REGION OF WAITING-FOR-RECOGNITION OBJECT

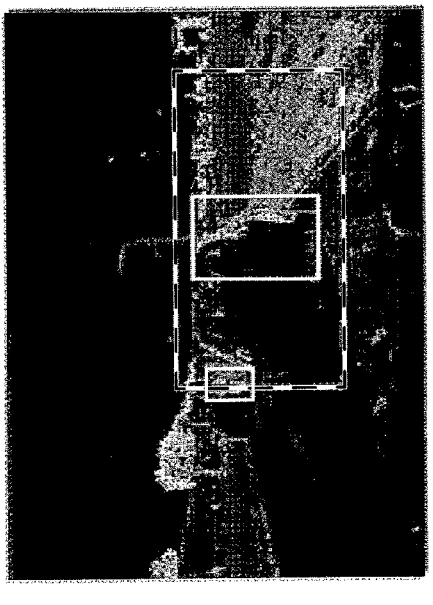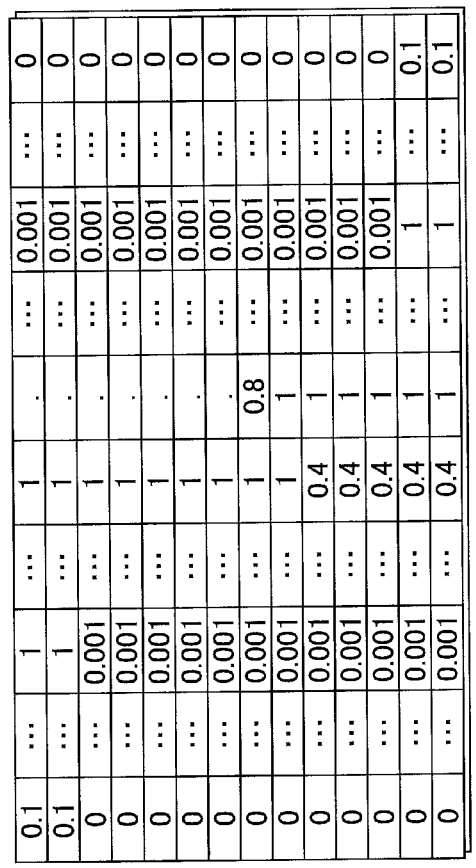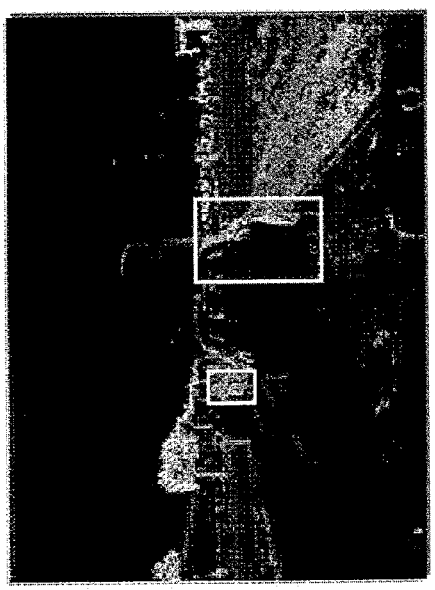
FIG.10

BEST MATCHING PART (a)

DISPARITY PROBABILITY MAP OF Dobj

(b)

| 0 | ... | 0.9 | ... | . | . | . | 0 |
|---|---|---|---|---|---|---|---|
| 0 | ... | 0.9 | ... | . | . | . | 0 |
| 0.1 | ... | 0.9 | | . | | . | 0.1 |
| 0.1 | ... | 0.9 | . | . | . | . | 0.1 |
| 0.1 | ... | 0.9 | . | . | . | . | 0.1 |
| 0.1 | ... | 0.9 | . | . | . | . | 0.1 |
| 0.1 | ... | 0.9 | . | . | . | . | 0.1 |
| 0.1 | ... | 0.9 | . | 0.4 | . | 0.7 | 0.1 |
| 0.1 | ... | 0.9 | . | 0.4 | . | 0.7 | 0.1 |
| 0.1 | ... | 0.4 | . | 0.9 | . | 0.7 | 0.1 |
| 0 | ... | 0.4 | 1 | 0.9 | . | 0.7 | 0 |
| 0 | ... | 0.4 | 1 | 0.9 | . | 0.7 | 0 |
| 0 | ... | 0.4 | 1 | 0.9 | . | 0.7 | 0 |
| 0 | ... | 0.4 | 1 | 0.9 | . | 0.7 | 0 |

DISPARITY PROBABILITY MAP OF $Tobj_k$

(c)

| 0 | . | 0 | . | 0.9 | ... | . | . | 0.02 | 0.01 | 0 |
|---|---|---|---|---|---|---|---|---|---|---|
| 0 | . | 0 | . | 0.9 | ... | . | . | 0.02 | 0.01 | 0 |
| 0.1 | . | 0.7 | . | 0.9 | | . | . | 0.02 | 0.01 | 0.01 |
| 0.1 | . | 0.7 | . | 0.9 | | . | . | 0.02 | 0.01 | 0.01 |
| 0.1 | . | 0.7 | . | 0.9 | | . | . | 0.02 | 0.01 | 0.01 |
| 0.1 | . | 0.7 | . | 0.9 | | . | . | 0.02 | 0.01 | 0.01 |
| 0.1 | . | 0.7 | . | 0.9 | | . | . | 0.02 | 0.01 | 0.01 |
| 0.1 | . | 0.7 | . | 0.9 | . | 0.8 | . | 0.02 | 0.01 | 0.01 |
| 0.1 | . | 0.7 | . | 0.9 | . | 0.8 | . | 0.02 | 0.01 | 0.01 |
| 0.1 | . | 0.7 | . | 0.4 | . | 0.9 | . | 0.02 | 0.01 | 0.01 |
| 0 | . | 0.7 | . | 0.4 | 1 | 0.9 | . | 0.02 | 0.01 | 0.01 |
| 0 | . | 0.7 | . | 0.4 | 1 | 0.9 | . | 0.02 | 0.01 | 0.01 |
| 0 | . | 0.7 | . | 0.4 | 1 | 0.9 | . | 0.02 | 0.01 | 0.01 |
| 0 | . | 0.7 | . | 0.4 | 1 | 0.9 | . | 0.02 | 0.01 | 0.01 |

F()

DISPARITY PROBABILITY MAP OF (Dobj,k)

(d)

| 0 | . | 0.81 | ... | . | . | . | 0 |
|---|---|---|---|---|---|---|---|
| 0 | . | 0.81 | ... | . | . | . | 0 |
| 0.07 | . | 0.81 | | . | | . | 0.001 |
| 0.07 | . | 0.81 | . | . | . | . | 0.001 |
| 0.07 | . | 0.81 | . | . | . | . | 0.001 |
| 0.07 | . | 0.81 | . | . | . | . | 0.001 |
| 0.07 | . | 0.81 | . | . | . | . | 0.001 |
| 0.07 | . | 0.81 | . | 0.32 | . | 0.14 | 0.001 |
| 0.07 | . | 0.81 | . | 0.32 | . | 0.14 | 0.001 |
| 0.07 | . | 0.16 | . | 0.81 | . | 0.14 | 0.001 |
| 0 | . | 0.16 | 1 | 0.81 | . | 0.14 | 0 |
| 0 | . | 0.16 | 1 | 0.81 | . | 0.14 | 0 |
| 0 | . | 0.16 | 1 | 0.81 | . | 0.14 | 0 |
| 0 | . | 0.16 | 1 | 0.81 | . | 0.14 | 0 |

FIG.17
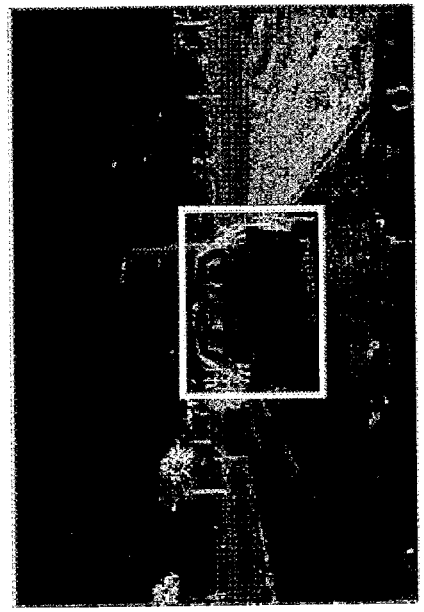
(a)
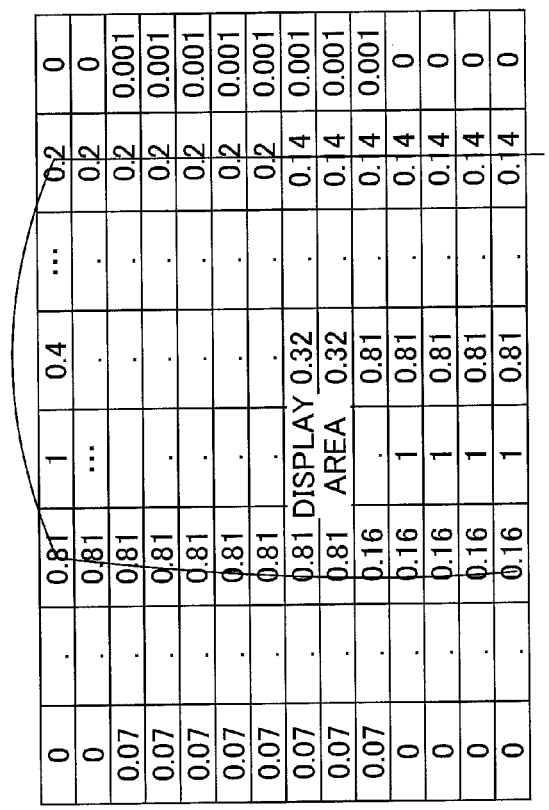
(b)

OBJECT TRACKING METHOD AND DEVICE

BACKGROUND OF THE INVENTION

1. Field of the Invention

The present invention generally relates to the field of image processing, and particularly relates to an object tracking method and device.

2. Description of the Related Art

Object tracking on the basis of image processing may be applied to a driver assistance system, a supermarket monitoring system, a patient monitoring system, and so on. Up to now, a lot of techniques for carrying out continuous object tracking with respect to a moving object on the basis of the image processing have been proposed.

For example, in U.S. Pat. No. 8,073,196 B2, a detection and tracking method of moving objects from a moving platform in presence of strong parallax is disclosed. In particular, one or more residual pixels are identified from video data. At least two geometric constraints are applied to the identified one or more residual pixels. A disparity of the one or more residual pixels to the applied at least two geometric constraints is calculated. Based on the detected disparity, the one or more residual pixels are classified as belonging to parallax or independent motion and the parallax classified residual pixels are filtered. Further, a moving object is tracked in the video data. Tracking the object includes representing the detected disparity in probabilistic likelihood models. Tracking the object also includes accumulating the probabilistic likelihood models within a number of frames during the parallax filtering. Further, tracking the object includes based on the accumulated probabilistic likelihood models, extracting an optimal path of the moving object.

Furthermore, in U.S. Patent Application Publication No. 2011/0052043 A1, a method of mobile platform detecting and tracking dynamic objects and computer-readable medium thereof are disclosed. In particular, the mobile platform acquires a three-dimensional (3D) image using a time-of-flight (TOF) sensor, removes a floor plane from the acquired 3D image using a random sample consensus (RANSAC) algorithm, and individually separates objects from the 3D image. Movement of the respective separated objects is estimated using a joint probability data association filter (JP-DAF).

SUMMARY OF THE INVENTION

According to a first aspect of the present invention, an object tracking method of tracking plural same-type objects based on continuous disparity maps is provided. The object tracking method includes:

a step of obtaining a first boundary region of a waiting-for-recognition object, which is detected from a current frame related disparity map, in the current frame related disparity map;

a step of calculating a probability of each valid pixel in the first boundary region belonging to a pixel for forming the waiting-for-recognition object, so as to get a pixel probability map of the waiting-for-recognition object;

a step of obtaining historic tracking data of each tracked object, which includes identifier information of the tracked object and a pixel probability map related to each of one or more prior frame related disparity maps prior to the current frame related disparity map;

a step of determining, based on matching of the pixel probability map of the waiting-for-recognition object and each of one or more pixel probability maps of each tracked object, identifier information of the waiting-for-recognition object, and updating the pixel probability map of the waiting-for-recognition object; and a step of updating, based on the updated pixel probability map of the waiting-for-recognition object, the first boundary region of the waiting-for-recognition object, so as to get a second boundary region of the waiting-for-recognition object.

According to a second aspect of the present invention, an object tracking device for tracking plural same-type objects based on continuous disparity maps is provided. The object tracking device includes:

a waiting-for-recognition object boundary region obtention part (hereinafter, called a "first obtention part") configured to obtain a first boundary region of a waiting-for-recognition object, which is detected from a current frame related disparity map, in the current frame related disparity map;

a waiting-for-recognition object pixel probability map calculation part (hereinafter, called a "calculation part") configured to calculate a probability of each valid pixel in the first boundary region belonging to a pixel for forming the waiting-for-recognition object, so as to get a pixel probability map of the waiting-for-recognition object;

a tracked object pixel probability map obtention part (hereinafter, called a "second obtention part") configured to obtain historic tracking data of each tracked object, which includes identifier information of the tracked object and a pixel probability map related to each of one or more prior frame related disparity maps prior to the current frame related disparity map;

a waiting-for-recognition object identifier and pixel probability map updating part (hereinafter, called a "first updating part") configured to determine, based on matching of the pixel probability map of the waiting-for-recognition object and each of one or more pixel probability maps of each tracked object, identifier information of the waiting-for-recognition object, and to update the pixel probability map of the waiting-for-recognition object; and a waiting-for-recognition object boundary region updating part (hereinafter, called a "second updating part") configured to update, based on the updated pixel probability map of the waiting-for-recognition object, the first boundary region of the waiting-for-recognition object, so as to get a second boundary region of the waiting-for-recognition object.

As a result, by utilizing the object tracking method and the object tracking device, it is possible to correct, on the basis of historic tracking results, a current object (i.e., a waiting-for-recognition object) detection result, so as to solve a problem that the rectangular boundary of the detected current object deviates from the corresponding actual object or becomes smaller. In other words, it is possible to perfect the rectangular boundary of the detected current object as much as possible, so as to be able to be inclusive of the overall outline of the corresponding actual object.

BRIEF DESCRIPTION OF THE DRAWINGS

FIG. 8 illustrates a table in which the value in each cell refers to a probability of a pixel, which is located in a first boundary region of a waiting-for-recognition object and corresponds to this cell, belonging to a pixel for forming the waiting-for-recognition object;

FIG. 9 is a flowchart of a process of calculating a probability of each valid pixel in a first boundary region of a waiting-for-recognition object belonging to a pixel for forming the waiting-for-recognition object, according to another embodiment of the present invention;

FIG. 10 includes four images (a), (b), (c), and (d) illustrating original boundary regions (i.e., the solid line rectangles), expanded boundary regions (i.e., the dotted line rectangles), an extracted expanded boundary region, and a pixel probability map corresponding to the extracted expanded boundary region, respectively.

FIG. 17 includes two images (a) and (b), wherein, the image (a) represents a part of a finally updated pixel probability map of a waiting-for-recognition object in which each probability is greater than a predetermined threshold, and the image (b) represents a corresponding boundary region, i.e., a second boundary region in a corresponding disparity map.

DETAILED DESCRIPTION OF THE PREFERRED EMBODIMENTS

In order to let those people skilled in the art better understand the present invention, hereinafter the present invention will be concretely described on the basis of the drawings and various embodiments.

Figure 1:
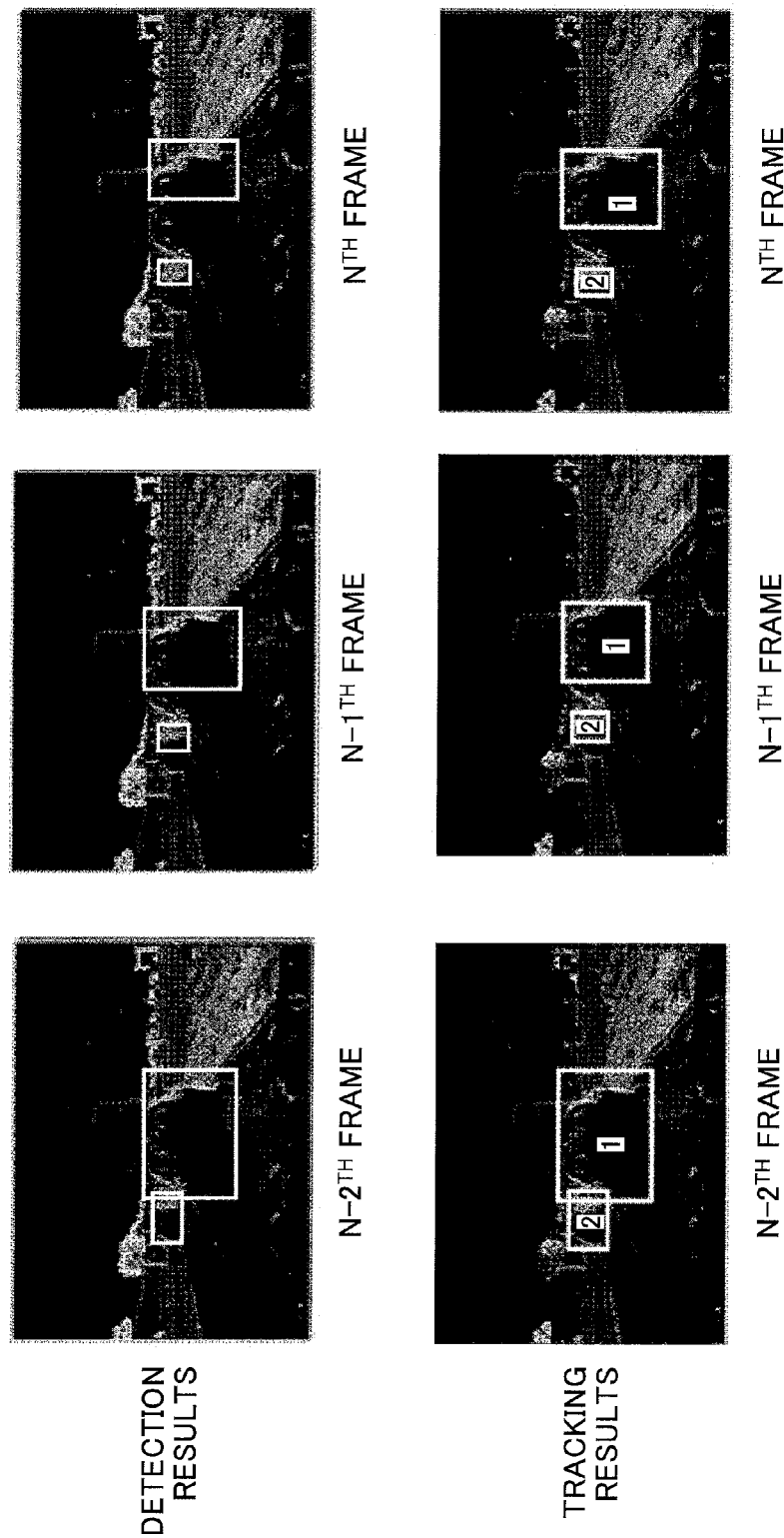
FIG. 1 illustrates a comparison of results obtained by conducting object detection and tracking on the basis of a conventional technique.

FIG. 1 illustrates a comparison of results obtained by conducting object detection and tracking on the basis of a conventional technique.

Here it should be noted that the object detection result of each frame refers to one obtained by performing the image processing only with respect to this frame (i.e., other frames are not involved). For example, in FIG. 1, regarding the N–$2^{th}$ frame, only this frame is processed so as to obtain the object detection result related to this frame (i.e., the information of the other frames, i.e., the $N^{th}$ and N–$1^{th}$ frames, are not taken into account); regarding the N–$1^{th}$ frame, only this frame is processed so as to obtain the object detection result related to this frame (i.e., the information of the other frames, i.e., the $N^{th}$ and N–$2^{th}$ frames, are not taken into account); and regarding the $N^{th}$ frame, only this frame is processed so as to obtain the object detection result related to this frame (i.e., the information of the other frames, i.e., the N–$1^{th}$ and N–$2^{th}$ frames, are not taken into account). In addition, there are no restrictions on the object detection techniques. It is possible to adopt any conventional object detection, location, and/or recognition technique.

On the contrary, the object tracking result of each frame refers to one obtained on the basis of the object detection result of this frame and the historic object tracking information of at least one prior frame. For example, in FIG. 1, regarding the N–$2^{th}$ frame, the object detection result of this frame and the historic object tracking information of N–$3^{th}$ and N–$4^{th}$ frames (not shown in FIG. 1) are utilized so as to obtain the object tracking result related to this frame; regarding the N–$1^{th}$ frame, the object detection result of this frame and the historic object tracking information of the N–$2^{th}$ and N–$3^{th}$ frames are utilized so as to obtain the object tracking result related to this frame; and regarding the $N^{th}$ frame, the object detection result of this frame and the historic objection tracking information of the N–$1^{th}$ and N–$2^{th}$ frames are utilized so as to obtain the object tracking result related to this frame.

According to FIG. 1, it is apparent that if the object detection result of each frame is not correct, then the obtained object tracking result is also not correct. In particular, it is obvious on the basis of the object detection results of the N–$2^{th}$, N–$1^{th}$, and $N^{th}$ frames that the located rectangular boundaries in these three frames gradually become smaller, i.e., the portions surrounded by the rectangular boundaries in these three frames gradually become smaller. In other words, the object to be detected cannot be completely surrounded by the corresponding rectangular boundary in some frames. As a result, the obtained object tracking results also gradually become smaller.

For this reason, it is necessary to provide a new technique by which the object detection result of a current frame can be corrected on the basis of the historic tracking results of its prior frames, i.e., the located rectangular boundary of the object to be detected in the current frame can be corrected so as to be able to completely surround the object to be detected.

Figure 2:
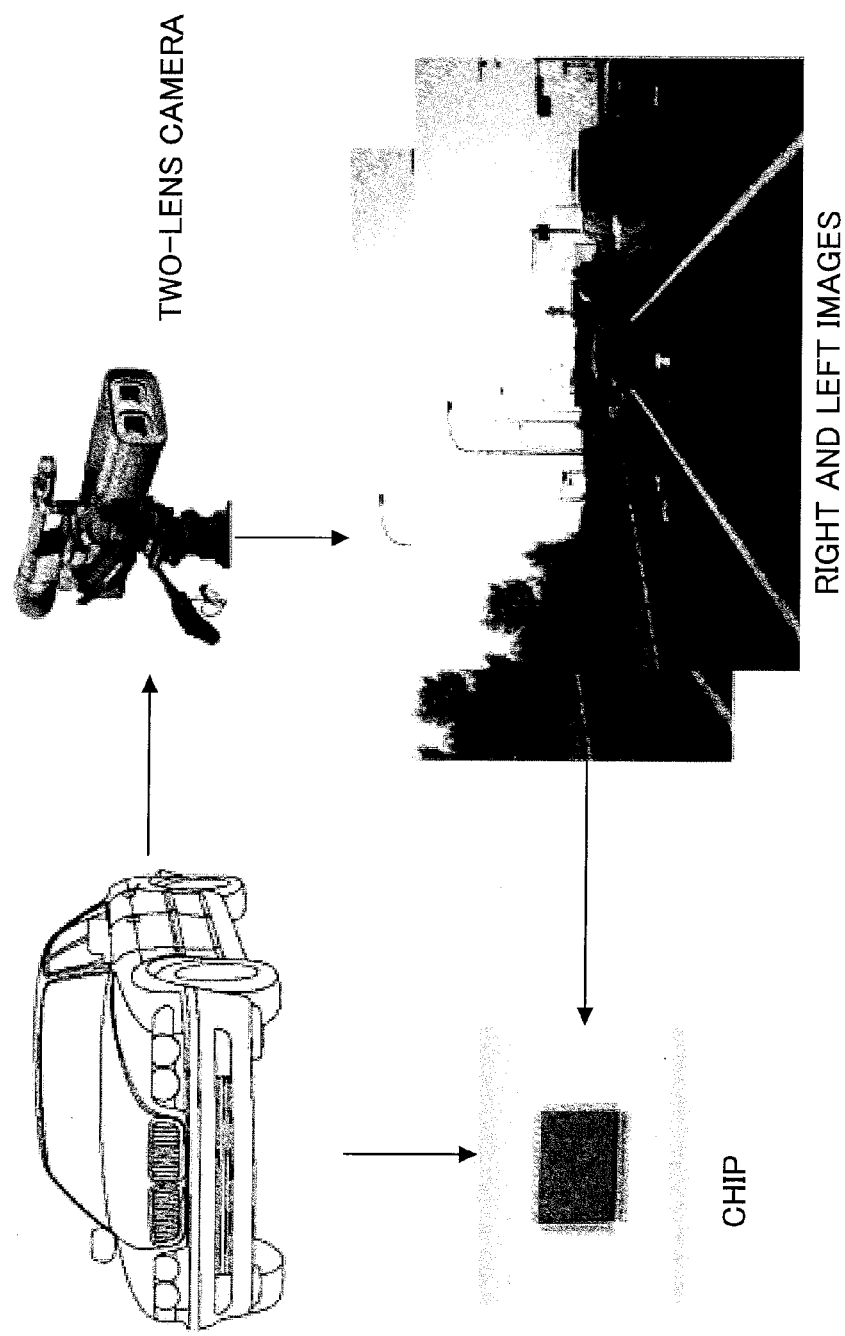
FIG. 2 illustrates a scenario in which the present invention may be applied.

FIG. 2 illustrates a scenario in which the present invention may be applied.

As shown in FIG. 2, a two-lens camera may be mounted in a vehicle for capturing right and left images. The right and left images may be input to an in-vehicle calculation device (for example, the chip shown in FIG. 2). And the in-vehicle calculation device may conduct detection and tracking of, for example, a vehicle on a road surface on the basis of the right and left images.

Figure 3:
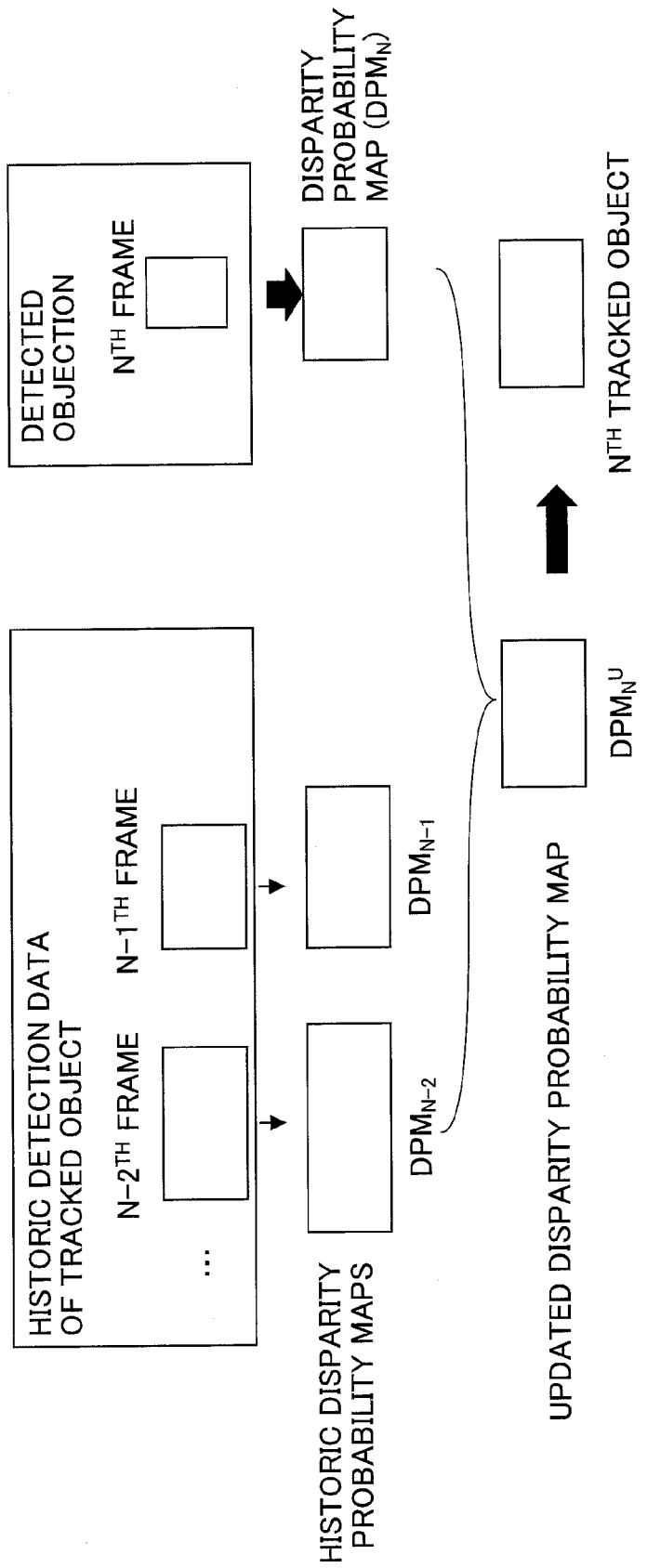
FIG. 3 is a diagram used for introducing the basic concept of the present invention.

FIG. 3 is a diagram used for introducing the basic concept of the present invention.

As shown in FIG. 3, regarding the $N^{th}$ frame, a disparity probability map $DPM_N$ (sometimes, also called a "pixel disparity map") of a waiting-for-recognition object (i.e., a detected object) is obtained. After that, this disparity probability map $DPM_N$ is updated on the basis of at least one historic disparity probability map of a tracked object (in FIG. 3, there are two historic disparity maps $DPM_{N-1}$ and $DPM_{N-2}$ corresponding to the $N-1^{th}$ and $N-2^{th}$ frames) and the disparity probability map $DPM_N$, so as to obtain an updated disparity probability map $DPM_N^U$ of the detected object. Ultimately, an objection tracking result of the $N^{th}$ frame is obtained on the basis of the updated disparity probability map $DPM_N^U$ of the detected object.

Figure 4:
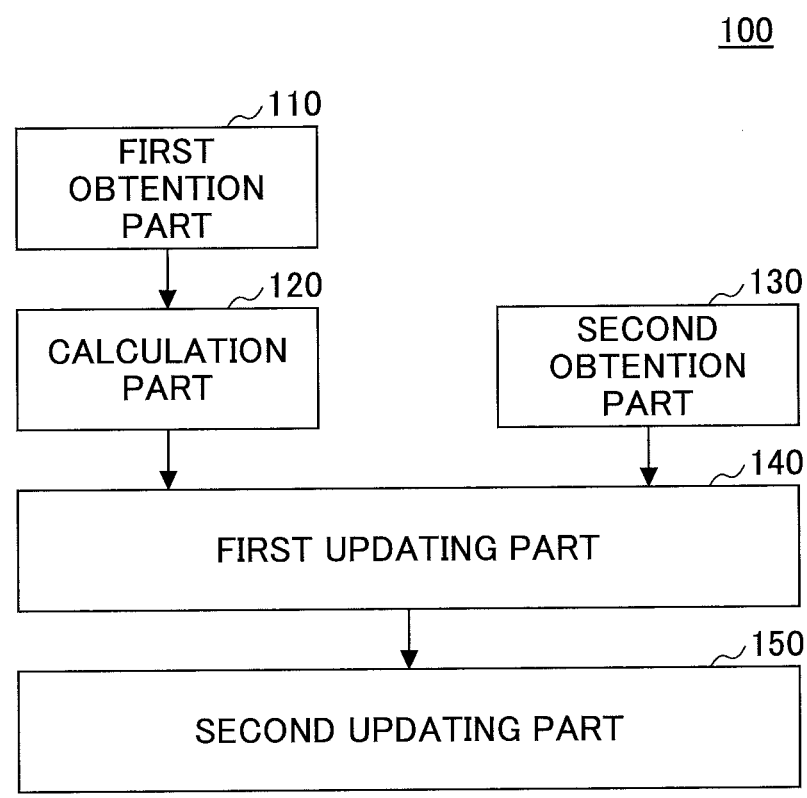
FIG. 4 is a block diagram of an object tracking device for tracking plural same-type objects on the basis of continuous disparity maps, according to an embodiment of the present invention.

FIG. 4 is a block diagram of an object tracking device 100 for tracking plural same-type objects on the basis of continuous disparity maps, according to an embodiment of the present invention.

Here it should be noted that the so-called "same-type objects" in this specification refer to ones belonging to a same type. For example, pedestrians belong to a same type; vehicles belong to a same type; and buildings belong to a same type.

Furthermore, the so-called "object tracking" in this specification refers to the tracking of plural same-type objects, in which identity recognition of each same-type object is involved. For example, if it is assumed that three same-type objects 1, 2, and 3 have been tracked, then when a same-type object has been detected in a current frame, it is necessary to determine whether the detected same-type object is a new one or one of the three same-type objects 1, 2, and 3, and then, to give an identifier to this detected same-type object on the basis of the determination result.

Moreover, the so-called "continuous disparity maps" refer to ones having a before-and-after relationship along the axis of time, for example, may be plural disparity maps extracted every one, two, or three frames.

As shown in FIG. 4, the object tracking device 100 may include a waiting-for-recognition object boundary region obtention part (i.e., a first obtention part) 110, a waiting-for-recognition object pixel probability map calculation part (i.e., a calculation part) 120, a tracked object pixel probability map obtention part (i.e., a second obtention part) 130, a waiting-for-recognition object identifier and pixel probability map updating part (i.e., a first updating part) 140, and a waiting-for-recognition object boundary region updating part (i.e., a second updating part) 150.

The first obtention part 110 is configured to obtain a first boundary region of a waiting-for-recognition object, which is detected from a current frame related disparity map, in the current frame related disparity map.

Here it should be noted that in this specification, an object detected from a current frame related disparity map refers to one that has not been determined whether it is a previously tracked one or a new one. As a result, this kind of object is called a "waiting-for-recognition object" or "detected object" in this specification. The two have the same meaning, i.e., an object which is detected from the current frame related disparity map, but has not been recognized on the basis of previous historic tracking data.

The calculation part 120 is configured to calculate a probability of each valid pixel in the first boundary region of the waiting-for-recognition object belonging to a pixel for forming the waiting-for-recognition object, so as to obtain a pixel probability map (i.e., a disparity probability map) of the waiting-for-recognition object.

The second obtention part 130 is configured to obtain the historic tracking data of each tracked object, which may include identifier information of this tracked object and a pixel probability map related to each prior frame related disparity map prior to the current frame related disparity map, and may also include location information, for example, boundary point coordinates, of this tracked object in each prior frame related disparity map.

The first updating part 140 is configured to determine, on the basis of the matching between the pixel probability map of the waiting-for-recognition object and each of one or more pixel probability maps of each tracked object, identifier information of the waiting-for-recognition object, and to update the pixel probability map of the waiting-for-recognition object.

The second updating part 150 is configured to update, on the basis of the updated pixel probability map of the waiting-for-recognition object, the first boundary region of the waiting-for-recognition object, so as to obtain a second boundary region of the waiting-for-recognition object. In an example, the size (area) of the second boundary region is greater than or equal to that of the first boundary region.

Here it should be noted that the first obtention part 110, the calculation part 120, the second obtention part 130, the first updating part 140, and the second updating part 150 may be coupled together via a bus line system (not shown in the drawings), and may be achieved by a central processing unit (CPU), a random access memory (RAM), a read-only memory (ROM), and program codes which may be stored in the RAM or ROM and may be implemented by the CPU.

In addition, the present invention is not limited to the structure of each part of the object tracking device 100 as well as the number of the parts of the object tracking device 100. Two or more parts of the object tracking device 100 may be combined as one independent part to implement or achieve the corresponding functions. And each part of the object tracking device 100 may also be divided into plural sub parts to implement or achieve the corresponding function.

Figure 5:
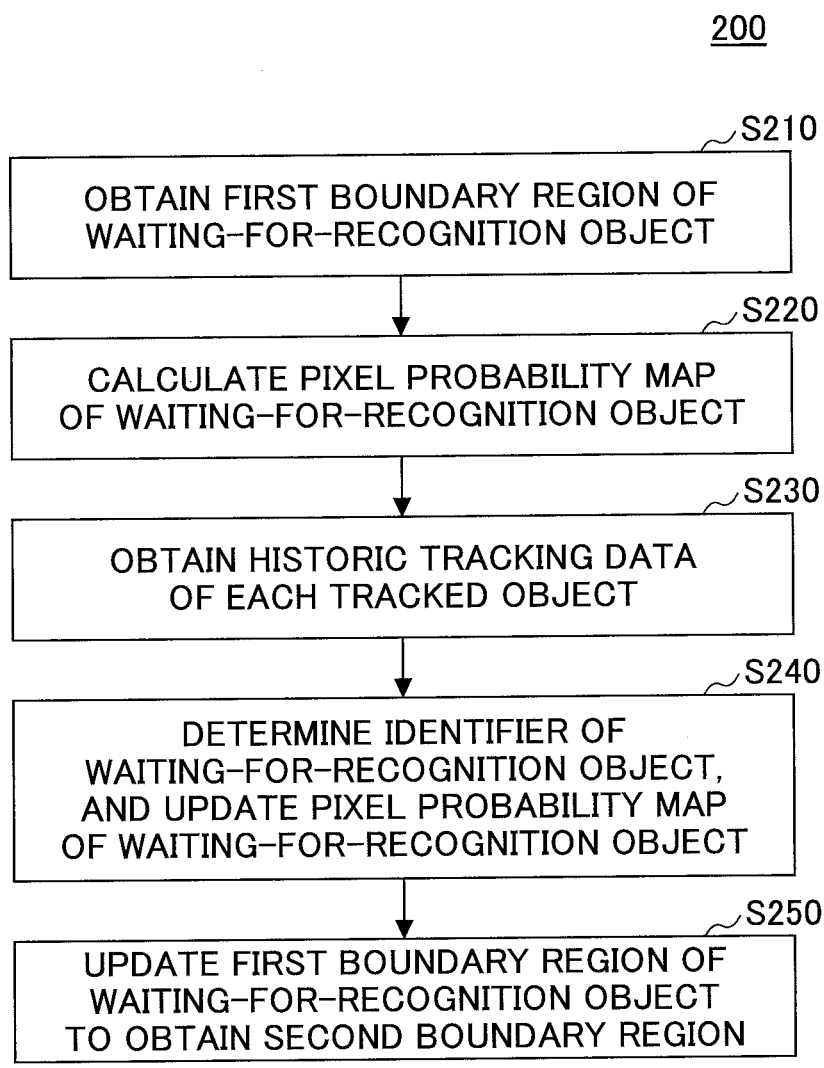
FIG. 5 is a flowchart of an object tracking method of tracking plural same-type objects on the basis of continuous disparity maps, according to an embodiment of the present invention.

FIG. 5 is a flowchart of an object tracking method 200 of tracking plural same-type objects on the basis of continuous disparity maps, according to an embodiment of the present invention.

Here it should be noted that the object tracking method 200 shown in FIG. 5 may be achieved by the object tracking device 100 shown in FIG. 4. That is to say, the steps shown in FIG. 5 may correspond to the parts shown in FIG. 4. Alternatively, the object tracking method 200 may be achieved by another device such as a desktop computer, a tablet computer, or a work station.

As shown in FIG. 5, in STEP S210, a first boundary region of a waiting-for-recognition object, which is detected from a current frame related disparity map, in the current frame related disparity map is obtained.

Here it should be noted that the first boundary region may be expressed by, for example, coordinates of right and left corner points of a rectangle. The current frame related disparity map may be obtained by a disparity map obtention part (not shown in FIG. 4) according to calculation performed on right and left images which are received from a two-lens camera, or may be obtained directly from an external device (not shown in the drawings).

Furthermore, the first boundary region of the waiting-for-recognition object is obtained on the basis of an object detection result acquired by carrying out object detection with respect to the current frame related disparity map, as shown in FIG. 1. It is possible to carry out the object detection by a local object detection device (not shown in FIG. 4) on the basis of a locally obtained disparity map (optionally, a grayscale image is also utilized) in real time, so as to acquire the object detection result. Alternatively, it is possible to acquire the object detection result directly from an external device (not shown in the drawings).

Moreover, in the present invention, there are no restrictions on the object detection methods. Any kind of proper object detection method may be used in the present invention. For example, it is possible to adopt the object detection method described in "Zhencheng Hu, Francisco Lamosa, Keiichi Uchimura: A Complete U-V-Disparity Study for Stereovision Based 3D Driving Environment Analysis. 3DIM 2005: 204-211".

In STEP S220, a probability of each valid pixel in the first boundary region of the waiting-for-recognition object belonging to a pixel for forming the waiting-for-recognition object is calculated, so as to obtain a pixel probability map (i.e., a disparity probability map) of the waiting-for-recognition object.

Figure 6:
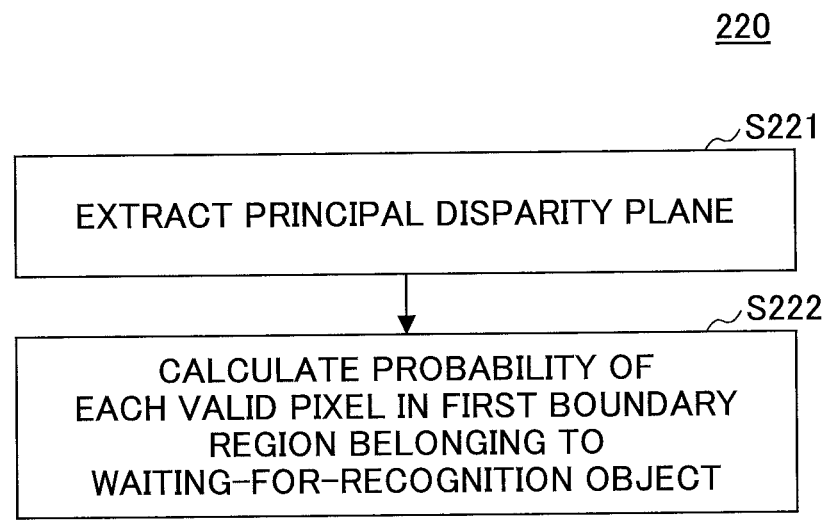
FIG. 6 is a flowchart of a process of calculating a probability of each valid pixel in a first boundary region of a waiting-for-recognition object belonging to a pixel for forming the waiting-for-recognition object, according to an embodiment of the present invention.

FIG. 6 is a flowchart of a process 220 of calculating a probability of each valid pixel in a first boundary region of a waiting-for-recognition object belonging to a pixel for forming the waiting-for-recognition object, according to an embodiment of the present invention.

Here it should be noted that the process 220 shown in FIG. 6 may be applied to STEP S220 shown in FIG. 5.

As shown in FIG. 6, in STEP S221, a plane of the waiting-for-recognition object, which is normal to a disparity direction is extracted, so as to serve as a principal disparity plane.

Here, the disparity direction is also called a "depth direction", and is one normal to a corresponding grayscale image plane.

In an example, it is possible to obtain the number of pixels corresponding to each disparity, in the first boundary region of the waiting-for-recognition object; then, to determine the disparity corresponding to the maximum number of pixels; and then, to let a plane corresponding to the determined disparity serve as the principal disparity plane. In other words, it is possible to say that there are many disparity planes along the depth direction, and one of the disparity planes, on which the number of pixels is maximum, is the principal disparity plane.

Here it should be noted that the above-described method of selecting the principal disparity plane is just an example. Alternatively, for instance, it is possible to choose the principal disparity plane by utilizing a method as follows. Namely, if it is assumed that in the first boundary region of the waiting-for-recognition object, the minimum disparity is dmin, and the maximum disparity is dmax, then it is possible to let a disparity plane corresponding to a disparity dm=(dmin+dmax)/2 serve as the principal disparity plane.

From a physical point of view, ideally, the principal disparity plane is regarded representing the position of the waiting-for-recognition object along the depth direction.

Figure 7:
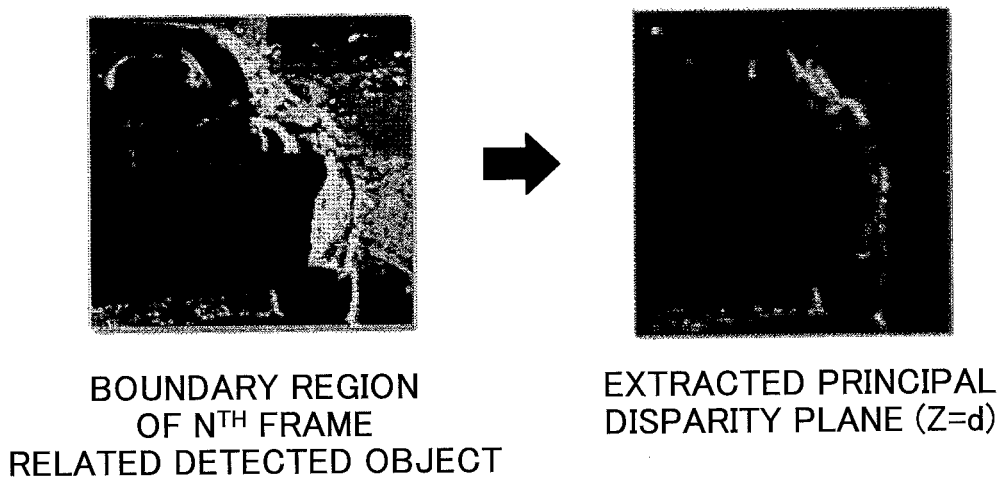
FIG. 7 illustrates a first boundary region of a detected object (i.e., a waiting-for-recognition object) in a current frame and an extracted disparity map on a principal disparity plane.

FIG. 7 illustrates a first boundary region of a detected object (i.e., a waiting-for-recognition object) in a current frame and an extracted disparity map on a principal disparity plane.

In STEP S222 shown in FIG. 6, on the basis of the distance from each valid pixel in the first boundary region of the waiting-for-recognition object to the principal disparity plane, the probability of each valid pixel in the first boundary region belonging to a pixel for forming the waiting-for-recognition object is determined. Here it should be noted that the smaller the distance from a pixel to the principal disparity plane is, the larger the probability of the pixel belonging to a pixel for forming the waiting-for-recognition object is.

Furthermore, the so-called "valid pixel" refers to one having a disparity not equal to zero.

In an example, it is possible to adopt the following equation (1) to calculate the probability of each valid pixel in the first boundary region of the waiting-for-recognition object belonging to a pixel for forming the waiting-for-recognition object.

$$\text{weight}(x,y,d)=C1/(\text{distance}+1) \quad (1)$$

Here, distance refers to the distance from a pixel, whose disparity is d, to the principal disparity plane (whose corresponding disparity is dm), and may be obtained on the basis of the disparities d and dm; and C1 is predetermined constant, and C1>0.

In addition, it should be noted the above equation (1) is just an example. It is also possible to use another formula to compute the probability of each valid pixel in the first boundary region of the waiting-for-recognition object belonging to a pixel for forming the waiting-for-recognition object.

FIG. 8 illustrates a table in which the value in each cell refers to a probability of a pixel, which is located in a first boundary region of a waiting-for-recognition object and corresponds to this cell, belonging to a pixel for forming the waiting-for-recognition object.

In the table shown in FIG. 8, each row corresponds to the x-axis, and each column corresponds to the y-axis. As a result, the coordinates of each cell in the table are (x,y), and the value in this cell represents the probability of the pixel corresponding to this cell belonging to a pixel for forming the waiting-for-recognition object.

FIG. 9 is a flowchart of a process 220' of calculating a probability of each valid pixel in a first boundary region of a waiting-for-recognition object belonging to a pixel for forming the waiting-for-recognition object, according to another embodiment of the present invention.

The difference between the process 220' shown in FIG. 9 and the process 200 shown in FIG. 6 is that in the process 220', there is an additional step, i.e., STEP S223. Since STEPS S221 and S222 in the process 220' are the same as those in the process 200, their descriptions are omitted here.

In STEP S223, the first boundary region of the waiting-for-recognition object is gradually expanded until the probability of a pixel in the expanded region belonging to a pixel for forming the waiting-for-recognition object is less than a predetermined threshold.

In an example, it is possible to expand, according to a predetermined step length along the width direction of a corresponding image, the first boundary region, and to calculate the probability of a pixel in the expanded region belonging to a pixel for forming the waiting-for-recognition object. If the calculated probability is greater than or equal to the predetermined threshold, then the first boundary region may be continuously expanded; otherwise, the expanding process may end, and the boundary region expanded in the immediately previous step may be determined as a new first boundary region (for the sake of convenience, hereinafter, also called a "first boundary region").

The reason of conducting the expanding process is that an originally obtained first boundary region of a waiting-for-recognition object in a current frame may be smaller. As a result, it is necessary to expand the originally obtained first boundary region in the current frame. In an example, it is possible to carry out a size (area) comparison of the originally detected first boundary region in the current frame and the corresponding first boundary region in the immediately previous frame. If the size of the originally obtained first boundary region in the current frame is less than that of the corresponding first boundary region in the immediately previous frame, and the decreasing degree (i.e., the difference of the two) is greater than or equal to a predetermined threshold, then the above expanding process may be performed.

FIG. 10 includes four images (a), (b), (c), and (d) illustrating original boundary regions (i.e., the solid line rectangles), expanded boundary regions (i.e., the dotted line rectangles), an extracted expanded boundary region, and a pixel probability map corresponding to the extracted expanded boundary region, respectively.

Up to here, the process of calculating the pixel probability map of the waiting-for-recognition object (i.e., STEP S220 shown in FIG. 5) has been described in detail by referring to FIGS. 6 to 10.

Here, refer to FIG. 5 again; after the calculation of the pixel probability map of the waiting-for-recognition object is finished in STEP S220, STEP S230 will be conducted.

In STEP S230, the historic tracking data of each tracked object is obtained. The historic tracking data of each tracked object includes identifier information of this tracked object as well as a pixel probability map related to each of one or more previous frame related disparity maps prior to the current frame related disparity map.

Here it should be noted that a tracking object may be given an unique identifier, and may be located in each frame. Moreover, it is possible to iteratively calculate a pixel probability map related to each frame according to the method 200 shown in FIG. 5. For example, regarding a first frame, each detected object may be located and given an identifier, and a corresponding pixel probability map may be calculated according to STEP S220 shown in FIG. 5; regarding a second frame, according to STEPS S210 to S250 shown in FIG. 5, it is possible to determine the identifier of each detected object, and to calculate a current frame (i.e., the second frame) related pixel probability map of each detected object; and so on.

In STEP S240 of FIG. 5, on the basis of the matching between the pixel probability map of the waiting-for-recognition object and one or more pixel probability maps of each tracked object, the identifier information of the waiting-for-recognition object is determined, and the pixel probability map of the waiting-for-recognition object is updated.

Figure 11:
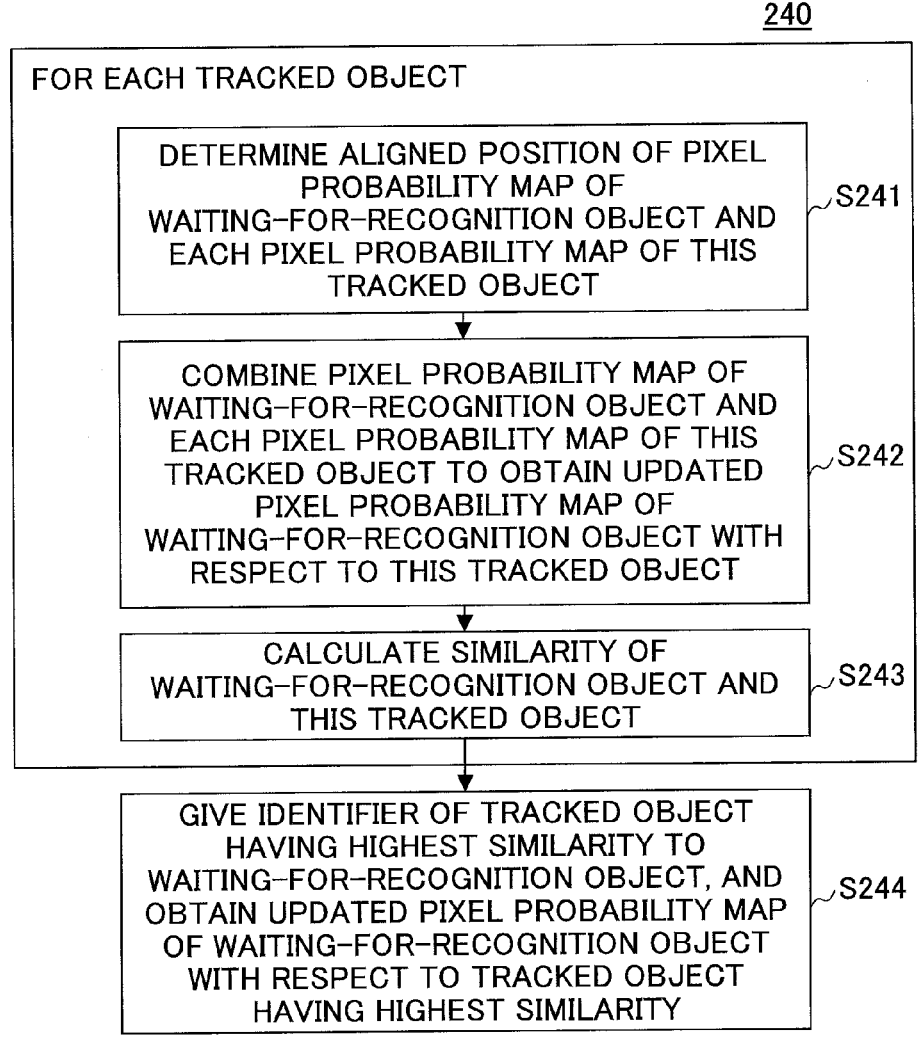
FIG. 11 is a flowchart of a process of determining, on the basis of the matching of a pixel probability map of a waiting-for-recognition object and each of one or more pixel probability maps of each tracked object, the identifier information of the waiting-for-recognition object, and updating the pixel probability map of the waiting-for-recognition object.

FIG. 11 is a flowchart of a process 240 of determining, on the basis of the matching between a pixel probability map of a waiting-for-recognition object and one or more pixel probability maps of each tracked object, the identifier information of the waiting-for-recognition object, and updating the pixel probability map of the waiting-for-recognition object.

The process 240 shown in FIG. 11 may be applied to S240 shown in FIG. 5.

As shown in FIG. 11, for each tracked object, STEPS S241 to S243 are carried out with respect to the corresponding tracked object so as to obtain the similarity of the waiting-for-recognition object and the corresponding tracked object. After that, STEP S244 is conducted in which an identifier is given to the waiting-for-recognition object, and the current frame related pixel probability map of the waiting-for-recognition object is updated.

In particular, in STEP S241, an aligned position of the pixel probability map of the waiting-for-recognition object and each of one or more pixel probability maps of the corresponding tracked object is determined.

The reason for determining the aligned position is as follows. Namely, if it is assumed that the waiting-for-recognition object is the corresponding tracked object, then their pixel probability maps should approach each other. However, the sizes of the two pixel probability maps may be different. In this case, it is necessary to determine the aligned position of the two pixel probability maps. Otherwise, it is impossible to perform the follow-on combination of the two pixel probability maps.

Regarding the aligned position, it differs according to a detected object, a dimension of concern, etc. For example, in a case where a tracked object is a vehicle, the position along the vehicle width direction is of concern, but not the position along the vehicle height direction. One of the reasons is that the feature along the vehicle height direction is relatively outstanding, and the positions along this direction in different frames are almost the same. On the other hand, in general, the vehicle tracking results along the vehicle width direction in different frames are different.

In an example, it is possible to achieve, according to the alignment of the projection of the waiting-for-recognition object onto the principal disparity plan of the current frame related disparity map and the projection of the corresponding tracked object onto the principal disparity plane of each historic frame related disparity map, the alignment of the pixel probability map of the waiting-for-recognition object and the corresponding frame related pixel probability map of the corresponding tracked object.

As described above, it is possible to let a plane, on which the disparity appearance frequency is highest in the first boundary region of the waiting-for-recognition object, serve as the principal disparity plane, and then, to project the principal disparity plane onto the x-axis. In particular, by obtaining the number of the projected points onto the x-axis of each pixel corresponding to the disparity whose appearance frequency is highest in the first boundary region of the waiting-for-recognition object, it is possible to obtain a horizontal projection histogram in which the horizontal dimension corresponds to the x-axis, and the vertical dimension refers to the number of pixels, whose disparity appearance frequencies are highest, at a x-coordinate.

Figure 12:
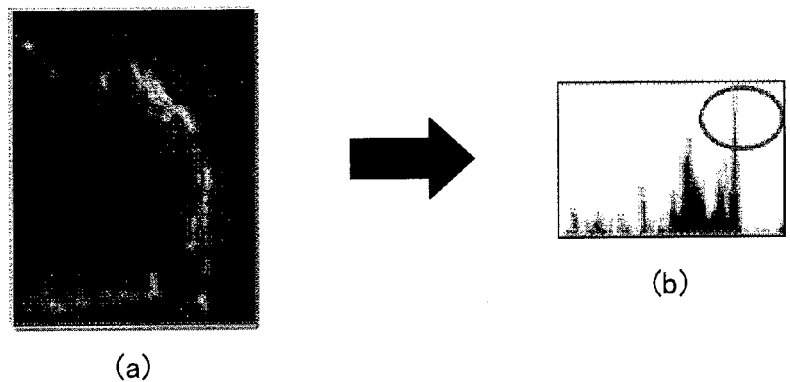
FIG. 12 includes two images (a) and (b) illustrating an extracted principal disparity plane and its projection onto an x-axis (i.e., a horizontal projection histogram), respectively.

FIG. 12 includes two images (a) and (b) illustrating an extracted principal disparity plane and its projection onto an x-axis (i.e., the above horizontal projection histogram), respectively.

As shown in FIG. 12, in the image (b), a peak is circled by an ellipse; the horizontal dimension corresponds to the x-axis; and the vertical dimension refers to the number of pixels having a maximum disparity at a x-coordinate.

In an example, it is possible to determine the aligned position of a boundary region of the waiting-for-recognition object and a boundary region of a tracked object in a historic frame by carrying out the following steps.

(1) Regarding the boundary region of the waiting-for-recognition object and the boundary region of the tracked object in the historic frame, generate first and second horizontal projection histograms, respectively.

(2) Move the first horizontal projection histogram of the waiting-for-recognition object on the second horizontal projection histogram of the boundary region related to the pixel probability map of the tracked object, and calculate the matching degrees of the two at different positions.

In an instance, the matching degree of a waiting-for-recognition object Dobj and a tracked object $Tobj_k$ at a position pos in the second horizontal projection histogram may be calculated by using the following equation (2).

$$\text{MatchDegree}_k(Dobj, Tobj_k, pos) = 1 - \Sigma w_i (h_{D,i} - h_{Ti})^* (h_{D,i} - h_{Ti})/t \quad (2)$$

Here, $\text{MatchDegree}_k(Dobj, Tobj_k, pos)$ refers to the matching degree (hereinafter, also called a "MD") of the first horizontal projection histogram of the waiting-for-recognition object Dobj and the second horizontal projection histogram of the tracked object $Tobj_k$ on the basis of the position pos (this position may be regarded as a candidate aligned position, and may move according a predetermine step length along the horizontal direction); i refers to the coordinate of the tracked object $Tobj_k$ on the horizontal axis of the second horizontal projection histogram, and pos≤i≤pos+Dobj_Width in which Dobj_Width represents the width of the boundary region of the detected object (i.e., the waiting-for-recognition object); $Tobj_k$ refers to the tracked object in the $k^{th}$ frame; $w_i$ refers to a corresponding weight at the position i; t refers to the width of the waiting-for-recognition object Dobj in the second horizontal projection histogram; $h_{D,i}$ refers to the vertical coordinate of the waiting-for-recognition object Dobj in the second horizontal projection histogram when x=i, i.e., the number of pixels; and $h_{Ti}$ refers to the vertical coordinate of the tracked object $Tobj_k$ in the second horizontal projection histogram when x=i, i.e., the number of pixels.

(3) Select the position where the matching degree is highest, i.e., MatchDegree=Max{MatchDegree(pos)}, to serve as the aligned position.

Figure 13:
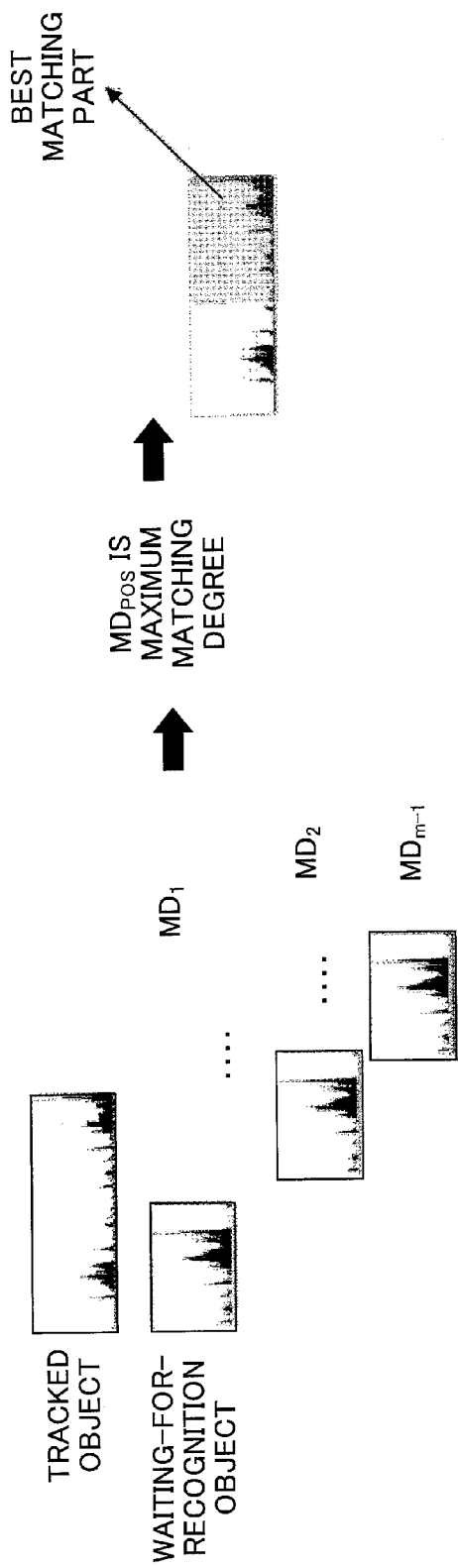
FIG. 13 illustrates a process of moving a horizontal projection histogram of a waiting-for-recognition object on a horizontal projection histogram of a boundary region related to a pixel probability map of a tracked object along the horizontal direction, calculating each matching degree, finding a maximum matching degree, and seeking a best matching part.

FIG. 13 illustrates a process of moving a horizontal projection histogram of a waiting-for-recognition object on a horizontal projection histogram of a boundary region related to a pixel probability map of a tracked object along the horizontal direction, calculating each matching degree, finding a maximum matching degree, and seeking a best matching part.

As shown in FIG. 13, as the horizontal projection histogram of the waiting-for-recognition object (i.e., the detected object) moves, the matching degrees $MD_1, Md_2, \ldots, MD_{m-1}$ are calculated at each position. Here it should be noted that the movement of the horizontal projection histogram of the waiting-for-recognition object means pos changes from 1 to the difference between the width of the second horizontal projection histogram of the tracked object and the width of the first horizontal projection histogram of the detected object (i.e., the width of the second horizontal projection histogram—the width of the first horizontal projection histogram). Moreover, the value of the maximum matching degree is expressed as $SS_{pos}$.

Here, refer to FIG. 11 again; after the aligned position of the pixel probability map of the waiting-for-recognition object and each of one or more pixel probability maps of the corresponding tracked object is determined in STEP S241, STEP S242 will be conducted.

In STEP S242, on the basis of the determined aligned position of the pixel probability map of the waiting-for-recognition object and each of one or more pixel probability maps of the corresponding tracked object, the pixel probability map of the waiting-for-recognition object and each of one or more pixel probability map of the corresponding tracked object are combined, so as to obtain an updated pixel probability map of the waiting-for-recognition object with respect to the corresponding tracked object.

In an example, it is possible to, regarding a tracked object with an identifier, align its pixel probability map relate to each historic frame with the pixel probability map of the waiting-for-recognition object, and then, to combine the pixel probability map related to each historic frame of the tracked object and the pixel probability map of the waiting-for-recognition object so as to obtain plural combined pixel probability maps. After that, the plural combined pixels probability maps are accumulated, so that an updated pixel probability map of the waiting-for-recognition object with respect to the tracked object is obtained.

For example, regarding a pixel probability map related to a $k^{th}$ historic frame of a tracked object $Tobj_k$, it is possible to calculate a disparity probability map $DPM(Dobj, Tobj_k)$ of a waiting-for-recognition object Tobj by using the following equation (3).

$$DPM(Dobj, Tobj_k) = F(\text{Initial } DPM \text{ of } Dobj, DPM \text{ of } Tobj_k) \quad (3)$$

Here, F refers to a predetermined function, and its parameters are the initial disparity probability map (DPM) of Dobj and the disparity probability map (DPM) of $Tobj_k$.

In an example, there is a positive correlation relationship between the output of the predetermined function F and the values in the initial disparity probability map of Dobj and the disparity probability map of $Tobj_k$. For instance, F may be the product of the values at the corresponding pixels in the two disparity probability maps. However, the predetermined function F is not limited to this; that is to say, it is also possible to design or adopt another formula according to actual needs.

Figure 14:
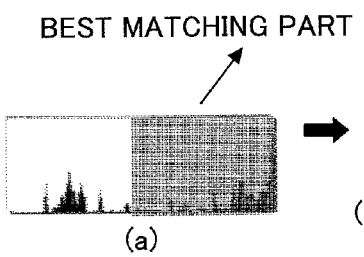
FIG. 14 illustrates a process of combining, on the basis of the aligned position of a pixel probability map of a waiting-for-recognition object and a pixel probability map of a tracked object, these two pixel probability maps so as to obtain an updated pixel probability map of the waiting-for-recognition object.

FIG. 14 illustrates a process of combining, on the basis of the aligned position of a pixel probability map of a waiting-for-recognition object and a pixel probability map of a tracked object, the two pixel probability maps so as to obtain an updated pixel probability map of the waiting-for-recognition object.

As shown in FIG. 14, four images (a), (b), (c), and (d) are included. The image (a) illustrates the best matching part of the horizontal projection histogram on the principal disparity plane of the tracked object and the horizontal projection histogram on the principal disparity plane of the waiting-for-recognition object, as shown above. The image (b) illustrates a disparity probability map of the waiting-for-recognition object. The image (c) illustrates a disparity probability map of the tracked object with respect to a $k^{th}$ frame, which is aligned with the disparity probability map of the waiting-for-recognition map shown in the image (b). The image (d) illustrates an updated disparity probability map of the waiting-for-recognition object, which is obtained on the basis of the disparity probability map of the tracking object shown in the image (c) and the disparity probability map of the waiting-for-recognition object shown in the image (b).

Here it should be noted that in the map (table) shown in each of the images (b), (c), and (d) of FIG. 14, each row corresponds to x-axis; each column corresponds to y-axis; each cell corresponds to a position (x,y); and the value at each cell represents a probability of the pixel at this cell belonging to the waiting-for-recognition object.

In this way, it is possible to update the pixel probability map of the waiting-for-recognition object with respect to each pixel probability map of the corresponding tracked object with the same identifier, so as to obtain plural updated pixel probability maps of the waiting-for-recognition object.

In an example, it is possible to accumulate the plural updated pixel probability maps of the waiting-for-recognition object, so as to obtain a finally updated pixel probability map of the waiting-for-recognition object with respect to the corresponding tracked object. After that, in STEP S243 of FIG. 11, it is possible to calculate, on the basis of the finally updated pixel probability map of the waiting-for-recognition object with respect to the corresponding tracked object, the similarity between the waiting-for-recognition object and the corresponding tracked object.

In an example, it is possible to calculate the finally updated pixel probability map of the waiting-for-recognition object with respect to the corresponding tracked object according to the following.

If it is assumed that a tracked object with an identifier (for example, P), i.e., $Tobj^P$, has k (0≤k≤N−1) previous frame related disparity probability maps, and the corresponding updated pixel probability maps of a waiting-for-recognition object Dobj with respect to the k previous frame related disparity probability maps are $DPM(Dobj,Tobj^P_{N-1})$, $DPM(Dobj,Tobj^P_{N-2})$, ..., $DPM(Dobj,Tobj^P_0)$, then, for instance, it is possible to obtain a finally updated disparity probability map $DMP(Dobj)^P$ of the waiting-for-recognition object Dobj with respect to the tracked object $Tobj^P$ by using the following equation (4).

$$DPM(Dobj)^P = (w_{N-1}*DPM(Dobj,Tobj^P_{N-1}) + \ldots + w_0*DPM(Dobj,Tobj^P_0))/N \quad (4)$$

Here, $w_i$ refers to a weight. In an instance, $w_{N-1} > w_{N-2} > \ldots > w_0$. That is to say, the closer to the current frame a previous frame is, the larger the weight corresponding to this previous frame is. In an instance, wi=i/(N*(N+1)/2).

Figure 15:
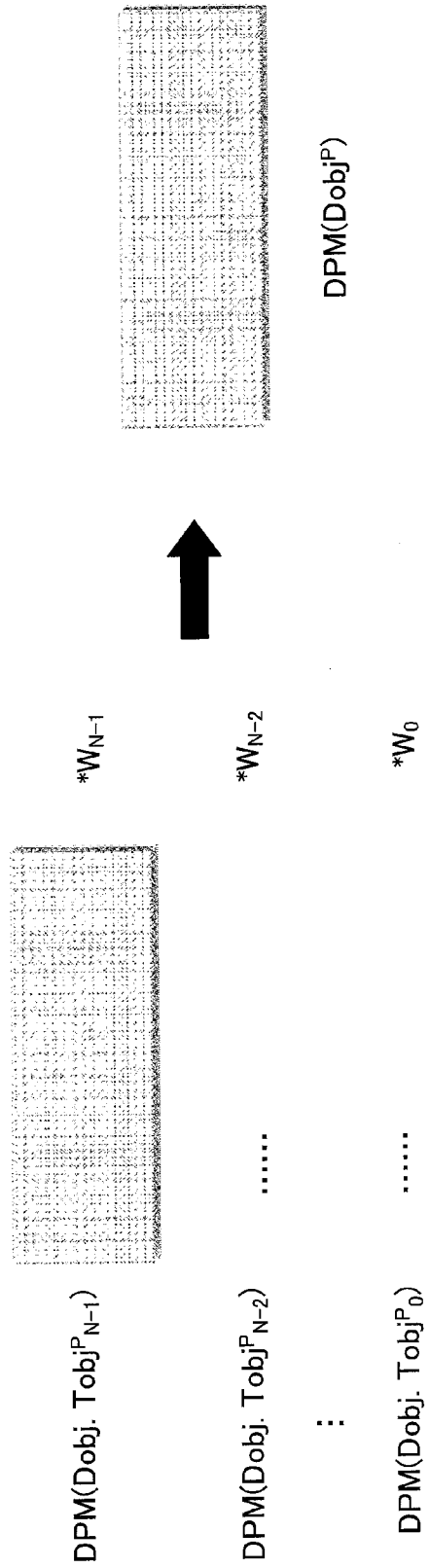
FIG. 15 illustrates a process of accumulating plural updated pixel probability maps of a waiting-for-recognition object with respect to each pixel probability map of a tracked object so as to obtain a finally updated pixel probability map of the waiting-for-recognition object with respect to the tracked object.

FIG. 15 illustrates a process of accumulating plural updated pixel probability maps of a waiting-for-recognition object with respect to each pixel probability map of a tracked object so as to obtain a finally updated pixel probability map of the waiting-for-recognition object with respect to the tracked object.

Here, refer to FIG. 11 again; after the finally updated pixel probability map of the waiting-for-recognition object with respect to the corresponding tracked object is obtained in S242, S243 will be conducted.

In STEP S243, on the basis of the finally updated pixel probability map of the waiting-for-recognition object with respect to the corresponding tracked object, it is possible to calculate the similarity between the waiting-for-recognition object and the corresponding tracked object.

In particular, after the finally updated pixel probability map $DPM(Dobj)^P$ of the waiting-for-recognition object Dobj with respect to the corresponding tracked object whose identifier is P is obtained, it is possible to calculate the similarity SimilarityScore(Dobj,$Tobj_P$) by using the following equation (5).

$$SimilarityScore(Dobj,Tobj_P) = \Sigma DPM(Dobj)^P(x,y)/(distance+1) \quad (5)$$

Here, $DPM(Dobj)^P(x,y)$ refers to a finally updated probability of a pixel at a position (x,y) belonging to the waiting-for-recognition object; and distance refers to the distance in the real world between a representative position of the first boundary region of the waiting-for-recognition object and a predicted region position of the corresponding tracked object in the current frame. For example, it is possible to select the central point of the first boundary region of the waiting-for-recognition object to serve as the representative position. In addition, regarding the predicted region position of the corresponding tracked object in the current frame, it may be predicted on the basis of the historic tracking information, for example, the position in the frame immediately prior to the current frame and the estimated moving speed of the corresponding tracked object.

Figure 16:
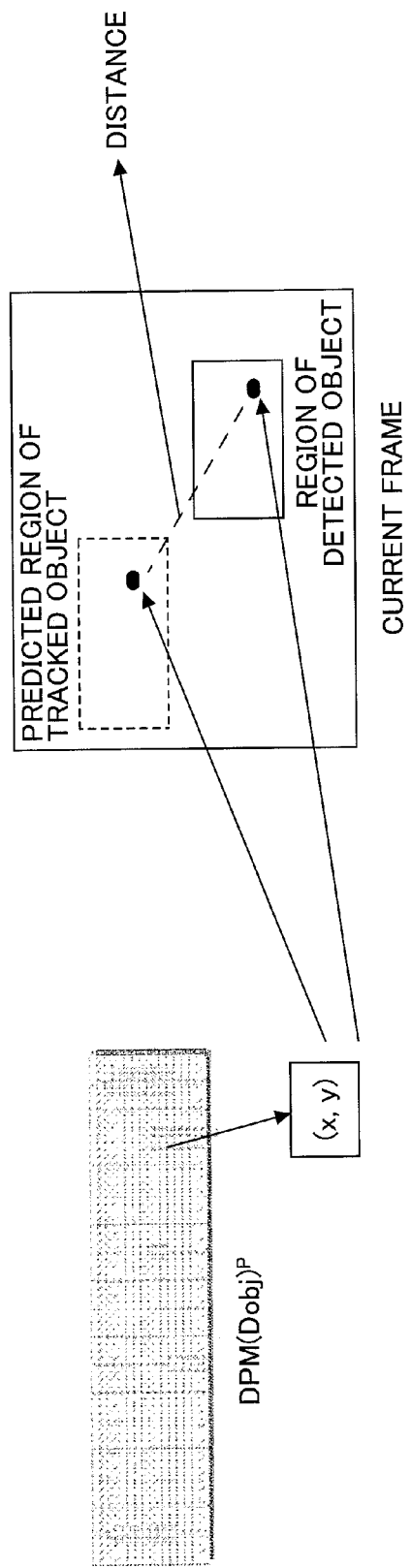
FIG. 16 illustrate a process of calculating, on the basis of a finally updated pixel probability map of a waiting-for-recognition object with respect to a tracked object (whose identifier is P) as well as the distance between a first boundary region of the waiting-for-recognition object and a predicted position of the tracked object in a current frame, the similarity between the waiting-for-recognition object and the tracked object.

FIG. 16 illustrate a process of calculating, on the basis of a finally updated pixel probability map of a waiting-for-recognition object with respect to a tracked object (whose identifier is P) as well as the distance between a first boundary region of the waiting-for-recognition object and a predicted position of the tracked object in a current frame, the similarity between the waiting-for-recognition object and the tracked object.

Here, refer to FIG. 11 again; for each of tracked objects 1, 2, ..., P, ..., STEPS S241 to STEP S243 are carried out with respect to the corresponding tracked object. In this way, it is possible to obtain the similarity between the waiting-for-recognition object and each of the tracked objects 1, 2, ..., P, .... As a result, it is apparent that regarding each of the tracked objects, STEPS S242 to S243 may be carried out in parallel. After STEPS S241 to S243 are carried out with respect to all the tracked object, STEP S244 will be conducted.

In STEP S244, the identifier of the tracked object whose similarity to the waiting-for-recognition is highest is given to the waiting-for-recognition object, and the finally updated pixel probability map of the waiting-for-recognition object with respect to the tracked object whose similarity to the waiting-for-recognition is highest is obtained.

For example, if it is assumed that the similarity of the waiting-for-recognition object Dobj and the tracked object whose identifier is P is highest, then it is possible to determine that the waiting-for-recognition object is the tracked object whose identifier is P, i.e., it is possible to give the identifier P to the waiting-for-recognition object, and, at the same time, it is possible to add the finally updated pixel probability map $DPM(Dobj)^P$ of the waiting-for-recognition object with respect to the tracked object, whose identifier is P, to the historic tracking data of the tracked object whose identifier is P.

In an example, it is possible to check whether the highest similarity is greater than a predetermined threshold. If the highest similarity is less than or equal to the predetermined threshold, then it is possible to determine that there isn't a tracked object similar to the waiting-for-recognition object. As a result, in this case, it is possible to determine that the waiting-for-recognition object is a new one, and to give a new unique identifier to the waiting-for-recognition object. In this case, the disparity probability map of the waiting-for-recognition object does not need to be updated on the basis of those of the tracked objects.

Up to here, the process of achieving STEP S240 shown in FIG. 5 has been described in detail by referring to FIGS. 11 to 16.

In the process of achieving STEP S240 shown in FIG. 5, first, on the basis of each historic disparity probability map related to a tracked object whose identifier is ID, it is possible to obtain an finally updated disparity probability map of a waiting-for-recognition object with respect to the tracked object whose identifier is ID; and then, it is possible to calculate the similarity between the waiting-for-recognition object and the tracked object whose identifier is ID.

In another example, it is also possible to achieve STEP S240 shown in FIG. 5 by carrying out the following steps.

(1) On the basis of the matching degree between the principal disparity plane of a waiting-for-recognition object in a current frame and each of a part or all of principal disparity planes related to one or more previous disparity maps of each tracked object whose identifier is ID, calculate the similarity between the waiting-for-recognition object and each tracked object whose identifier is ID.

In an example, as shown in FIG. 13, it is possible to determine the maximum matching degree and the best matching part between the horizontal projection histogram of the principal disparity plane of the waiting-for-recognition object and the horizontal projection histogram of the principal disparity plane of each historic disparity map of a tracked object. After that, it is possible to determine the similarity between the waiting-for-recognition object and the tracked object. For example, the similarity may be the weighted average (mean) of the maximum matching degrees between the principal disparity plane of the waiting-for-recognition object and the principal disparity planes of the tracked object in each historic frame related disparity maps.

(2) Determine the tracked object, whose similarity to the waiting-for-recognition object is highest, and its identifier.

(3) Give the identifier of the tracked object, whose similarity to the waiting-for-recognition object is highest, to the waiting-for-recognition object, and on the basis of the disparity probability map of the waiting-for-recognition object and the disparity probability map of the tracked object whose similarity to the waiting-for-recognition is highest, finally update the disparity probability map of the waiting-for-recognition object.

Here, refer to FIG. 5 again; after the identifier of the waiting-for-recognition object is determined, and the disparity probability map of the waiting-for-recognition object is finally updated, STEP S250 will be conducted.

In STEP S250, on the basis of the finally updated disparity probability map of the waiting-for-recognition object, it is possible to update the first boundary region of the waiting-for-recognition object so as to obtain a second boundary region of the waiting-for-recognition object.

In an example, it is possible to extract, on the basis of a predetermined threshold, pixels whose probabilities are greater than the predetermined threshold from the finally updated pixel probability map, and then, to let the minimum rectangular boundary formed by the extracted pixels be the second boundary region.

In another example, after extracting, on the basis of the predetermined threshold, the pixels whose disparity probabilities are greater than the predetermined threshold from the finally updated pixel probability map, it is also possible to check the extracted pixels so as to remove one or more outliers, and then, to let the minimum rectangular boundary formed by the retained pixels be the second boundary region.

In still another example, when obtaining the second boundary region, it is necessary to ensure that the size of the second boundary region is greater than or equal to that of the first boundary region. In this way, it is possible to let the waiting-for-recognition object in a current frame be as perfect as possible.

FIG. 17 includes two images (a) and (b), wherein, the image (a) represents a part of the finally updated pixel probability map of a waiting-for-recognition object in which each probability is greater than a predetermined threshold (for example, 0.1), and the image (b) represents a corresponding boundary region, i.e., a second boundary region in a corresponding disparity map.

It is possible to let a rectangle representing the second boundary region be displayed on a screen to serve as the tracking result. In addition, it is also possible to display other information such as the identifier of the waiting-for-recognition object on the screen.

Therefore, by utilizing the object tracking device and method according to the embodiments of the present invention, it is possible to correct, on the basis of the historic tracking results, a currently detected result, so as to solve a problem that the rectangular boundary of the currently detected object deviates from the corresponding actual object or becomes smaller. In other words, it is possible to correct the rectangular boundary of the currently detected object as perfect as possible, so as to be able to include the overall outline of the corresponding actual object.

In addition, the above-described object tracking device and method according to the embodiments of the present invention may be achieved by a computer system.

Figure 18:
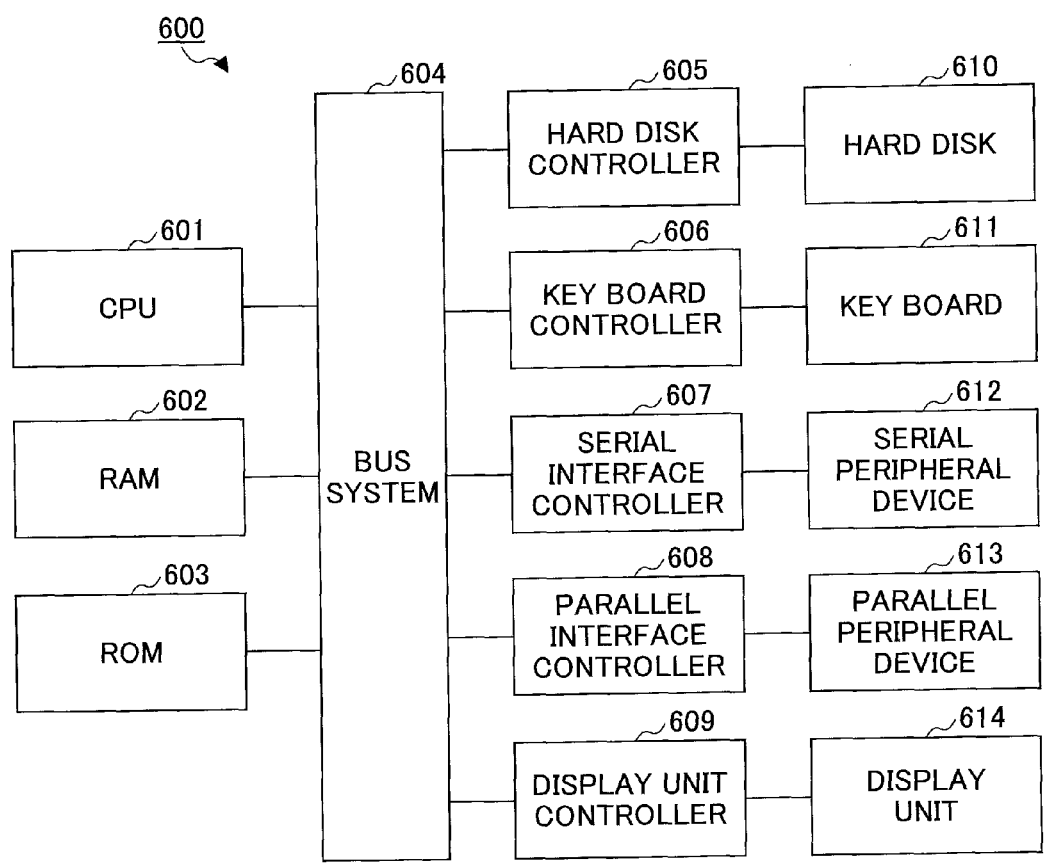
FIG. 18 is a block diagram of a computer system suitable for achieving the embodiments of the present invention.

FIG. 18 is a block diagram of a computer system 600 suitable for achieving the embodiments of the present invention.

As shown in FIG. 18, the computer system 600 may include a central processing unit (CPU) 601, a random access memory (RAM) 602, a read-only memory (ROM) 603, a bus 604, a hard disk controller 605, a keyboard controller 606, a serial interface controller 607, a parallel interface controller 608, a display unit controller 609, a hard disk 610, a keyboard 611, a serial peripheral device 612, a parallel peripheral device 613, and a display unit 614. The CPU 601, the RAM 602, the ROM 603, the hard disk controller 605, the keyboard controller 606, the serial interface controller 607, the parallel interface controller 608, and the display unit controller 609 are coupled with the bus 604. The hard disk 610 is coupled with the hard disk controller 605. The keyboard 611 is coupled with the keyboard controller 606. The serial peripheral device 612 is coupled with the serial interface controller 607. The parallel peripheral device 613 is coupled with the parallel interface controller 608. The display unit 614 is coupled with the display unit controller 609. It should be noted that the computer system shown in FIG. 18 is just an example, and is not used to restrict the present invention. In some cases, it is also possible to increase or decrease some components.

Here it should be noted that the above respective embodiments are just exemplary ones, and the specific structure and operation of each of them may not be used for limiting the present invention.

Moreover, the embodiments of the present invention may be implemented in any convenient form, for example, using dedicated hardware, or a mixture of dedicated hardware and software. The embodiments of the present invention may be implemented as computer software implemented by one or more networked processing apparatuses. The network may comprise any conventional terrestrial or wireless communications network, such as the Internet. The processing apparatuses may comprise any suitably programmed apparatuses such as a general-purpose computer, personal digital assistant, mobile telephone (such as a WAP or 3G-compliant phone) and so on. Since the embodiments of the present invention can be implemented as software, each and every aspect of the present invention thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present invention is described with reference to the specific embodiments chosen for purpose of illustration, it should be apparent that the present invention is not limited to these embodiments, but numerous modifications could be made thereto by those people skilled in the art without departing from the basic concept and technical scope of the present invention.

The present application is based on and claims the benefit of priority of Chinese Patent Application No. 201310687905.6 filed on Dec. 16, 2013, the entire contents of which are hereby incorporated by reference.

What is claimed is:

1. A method of tracking plural some-type objects based on continuous disparity maps, comprising:
   a step of obtaining a first boundary region of a waiting-for-recognition object, which is detected from a disparity map related to current frame, in the disparity map related to the current frame;
   a step of calculating a probability of each valid pixel in the first boundary region of the waiting-for-recognition object belonging to a pixel for forming the waiting-for-recognition object, so as to obtain a pixel probability map of the waiting-for-recognition object;
   a step of obtaining historic tracking data of each tracked object, which includes identifier information of the tracked object and a pixel probability map related to each of one or more prior frame related disparity maps prior to the disparity map related to the current frame;
   a step of determining, based on matching of the pixel probability map of the waiting-for-recognition object and each of one or more pixel probability maps of each tracked object, identifier information of the waiting-for-recognition object, and updating the pixel probability map of the waiting-for-recognition object; and
   a step of updating, based on the updated pixel probability map of the waiting-for-recognition object, the first boundary region of the waiting-for-recognition object, so as to obtain a second boundary region of the waiting-for-recognition object.

2. The method according to claim 1, wherein, the step of obtaining the pixel probability map of the waiting-for-recognition object includes:
   extracting a plane of the waiting-for-recognition object, normal to a disparity direction to serve as a principal disparity plane; and
   determining, based on a distance between each valid pixel in the first boundary region of the waiting-for-recognition object and the principal disparity plane, the probability of each valid pixel in the first boundary region of the waiting-for-recognition object belonging to pixel for forming the waiting-for-recognition object, wherein, the smaller a distance between a valid pixel in the first boundary region of the waiting-for-recognition object and the principal disparity plane is, the larger a probability of the valid pixel belonging to a pixel for forming the waiting-for-recognition object is.

3. The method according to claim 2, wherein:
   a plane of the waiting-for-recognition object, on which a number of valid pixels is maximum and which is normal to the disparity direction, is extracted to serve as the principal disparity plane.

4. The method according to claim 3, further comprising:
   a step of gradually expanding the first boundary region of the waiting-for-recognition object to obtain an expanded first boundary region until a pixel in the expanded first boundary is less than a predetermined threshold.

5. The method according to claim 1, wherein, the step of determining the identifier information of the waiting-for-recognition object and updating the pixel probability map of the waiting-for-recognition object includes:
   for each tracked object,
      determining an aligned position of the pixel probability map of the waiting-for-recognition object and each of one or more pixel probability maps of the corresponding object;
      combining, based on the determined aligned position, the pixel probability map of the waiting-for-recognition object and each of one or more pixel probability maps of the corresponding tracked object so as to obtain an updated pixel probability map of the waiting-for-recognition object with respect to the corresponding tracked object; and
      calculating, based on the updated pixel probability map of the waiting-for-recognition object with respect to the corresponding tracked object, a similarity between the waiting-for-recognition object and the corresponding tracked object, and
   giving an identifier of a tracked object, whose similarity to the waiting-for-recognition object is highest, to the waiting-for-recognition object, and obtaining an updated pixel probability map of the waiting-for-recognition object with respect to the tracked object whose similarity to the waiting-for-recognition object is highest.

6. The method according to claim 5, wherein, the obtention of the updated pixel probability map of the waiting-for-recognition object with respect to the corresponding tracked object includes:
   multiplying the pixel probability map of the waiting-for-recognition by each of one or more pixel probability maps of the corresponding tracked object so as to obtain one or more results, and then, obtaining a cumulative weighted result of the one or more results,
   wherein, the smaller a distance between a pixel probability map of the corresponding tracked object and the pixel probability map of the waiting-for-recognition object along an axis of time is, the larger a weight related to this pixel probability map of the corresponding tracked object, used for obtaining the cumulative weighted result is.

7. The method according to claim 5, wherein, the determination of the aligned position of the pixel probability map of the waiting-for-recognition object and each of one or more pixel probability maps of the corresponding tracked object includes:
   obtaining a number of projected points onto a horizontal x-axis of each pixel corresponding to a disparity whose appearance frequency is highest in the first boundary region of the waiting-for-recognition object, so as to obtain a first horizontal projection histogram in which a dimension corresponds to x-axis, and another dimension refers to a number of pixels corresponding to the disparity whose appearance frequency is highest;

obtaining a second horizontal projection histogram of a boundary region related to the corresponding pixel probability map of the corresponding tracked object;

moving the first horizontal projection histogram on the second horizontal projection histogram, and calculating matching degrees of the two histograms at different positions; and determining a position, where a matching degree of the two histograms is highest, to serve as the aligned position.

8. The method according to claim 5, wherein, the calculation of the similarity of the waiting-for-recognition object and the corresponding tracked object includes:

calculating, based on the updated pixel probability map of the waiting-for-recognition object and a distance between the first boundary region of the waiting-for-recognition object and a predicted region of the corresponding tracked object in the current frame, the similarity of the waiting-for-recognition object and the corresponding tracked object, wherein, the predicted region of the corresponding tracked object in the current frame is predicted based on the historic tracking data of the corresponding tracked object.

9. The method according to claim 1, wherein, the step of determining the identifier information of the waiting-for-recognition object and updating the pixel probability map of the waiting-for-recognition object includes:

calculating, based on matching degrees between a principal disparity plane of the waiting-for-recognition object in the current frame and all or a part of principal disparity planes related to one or more prior disparity map of each tracked object having an identifier, a similarity of the waiting-for-recognition object and each tracked object having an identifier;

determining a tracked object, whose similarity to the waiting-for-recognition object is highest, and its identifier; and giving the identifier of the tracked object, whose similarity to the waiting-for-recognition object, to the waiting-for-recognition object, and updating, based on the pixel probability map of the waiting-for-recognition objet and the pixel probability map of the tracked object whose similarity to the waiting-for-recognition object is highest, the pixel probability map of the waiting-for-recognition object.

10. A device of tracking plural some-type objects based on continuous disparity maps, comprising:

a first obtention part configured to obtain a first boundary region of a waiting-for-recognition object, which is detected from a disparity map related to current frame, in the disparity map related to the current frame;

a calculation part configured to calculate a probability of each valid pixel in the first boundary region of the waiting-for-recognition object belonging to a pixel for forming the waiting-for-recognition object, so as to get a pixel probability map of the waiting-for-recognition object;

a second obtention part configured to obtain historic tracking data of each tracked object, which includes identifier information of this tracked object and a pixel probability map related to each of one or more prior frame related disparity maps prior to the disparity map related to the current frame;

a first updating part configure to determine, based on matching of the pixel probability map of the waiting-for-recognition object and each of one or more pixel probability maps of each tracked object, identifier information of the waiting-for-recognition object, and to update the pixel probability map of the waiting-for-recognition object; and a second updating part configured to update, based on the updated pixel probability map of the waiting-for-recognition object, the first boundary region of the waiting-for-recognition object, so as to get a second boundary region of the waiting-for-recognition object.

* * * * *